No. 633,606. Patented Sept. 26, 1899.
J. H. NEWCOMB.
NUT LOCK.
(Application filed May 15, 1899.)
(No Model.)
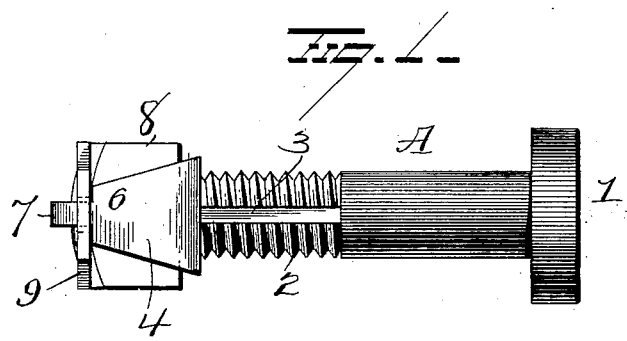
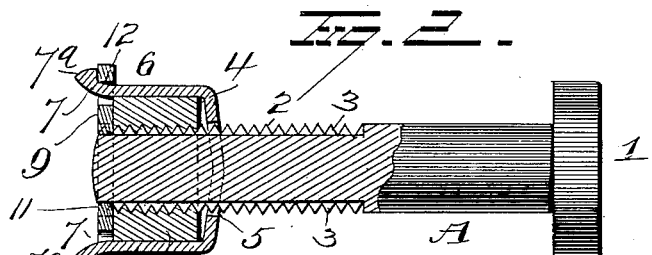
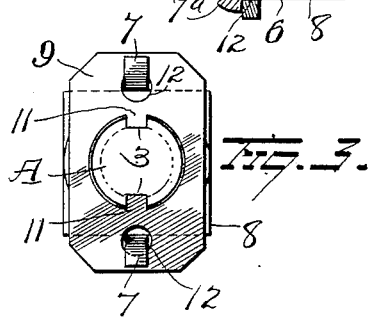
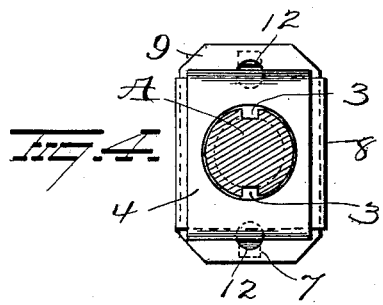
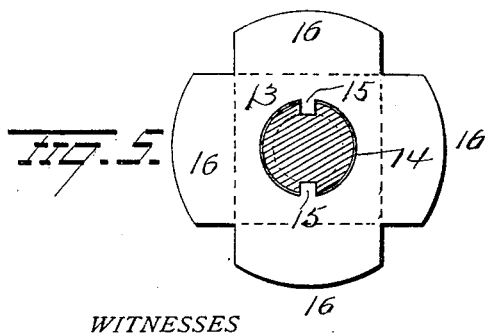
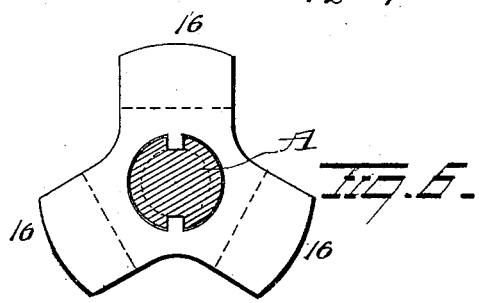
WITNESSES
INVENTOR

UNITED STATES PATENT OFFICE.

JOSEPH H. NEWCOMB, OF BRADFORD, PENNSYLVANIA.

NUT-LOCK.

SPECIFICATION forming part of Letters Patent No. 633,606, dated September 26, 1899.

Application filed May 15, 1899. Serial No. 716,880. (No model.)

*To all whom it may concern:*

Be it known that I, JOSEPH H. NEWCOMB, a resident of Bradford, in the county of McKean and State of Pennsylvania, have invented certain new and useful Improvements in Nut-Locks; and I do hereby declare the following to be a full, clear, and exact description of the invention, such as will enable others skilled in the art to which it appertains to make and use the same.

My invention relates to an improvement in nut-locks, the object of the invention being to provide improved means for securely locking a nut and bolt together and prevent accidental displacement of the nut on the bolt.

A further object is to provide a nut-lock which will be simple in construction, cheap to manufacture, and most effectual when in use.

With these objects in view the invention consists in certain novel features of construction and combinations and arrangements of parts, as will be more fully hereinafter described, and pointed out in the claim.

In the accompanying drawings, Figure 1 is a view illustrating my improvements. Fig. 2 is a view in section. Figs. 3 and 4 are detail views, and Figs. 5 and 6 are views of modified forms of my invention.

A represents a bolt having the usual head 1 on one end and provided with screw-threads 2. The screw-threaded portion of the bolt is provided with oppositely-disposed longitudinal grooves 3 3 for a purpose more fully hereinafter explained. A spring-metal plate 4, having a hole 5 therein for the free passage of the bolt and provided with parallel spring-arms 6, having contracted lugs 7 at their ends, is disposed on the bolt A. The lugs 7 are made with heads 7ª, provided with beveled outer faces. An ordinary nut 8 is screwed on the bolt A with the arms 6 of the plate 4 at opposite sides thereof, and the lugs 7 projecting beyond its outer face. A washer or plate 9 of any desired shape is provided with a central hole 10 for the accommodation of the bolt and with oppositely-disposed lugs or teeth 11, projecting into said central opening, said lugs being adapted to enter the grooves 3 in the bolt. The plate 9 is provided near each end with a hole or opening 12 for the passage of the lugs 7 on the locking-plate 4, and it will be seen that when the nut is screwed home the washer or plate 9 can be slipped on the end of the bolt and the beveled heads of the lugs 7 will engage the ends of the plate 9 and spring inward until the heads on the lugs have passed through the holes 12, when said heads will spring outward and securely lock the plate 9 in place, and hence prevent any possibility of the nut turning.

Instead of constructing my improved device as above described I might construct same as shown in Fig. 5. In this form of my invention I provide a locking-plate or washer 13 between the nut and the article or articles to be secured. The locking-plate or washer 13 is provided with a central opening 14 for the passage of the bolt and with diametrically opposite lugs or teeth 15, projecting into said central opening and adapted to be disposed in the grooves in the bolt. The locking-plate or washer 13 is provided with four flaps 16, adapted to be bent down against the nut and secure the latter, or I might construct the washer or locking plate as shown in Fig. 6. This form of my invention is precisely like Fig. 5, except that the locking-plate or washer 13 is provided with three flaps 16 instead of four.

Various slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

In a nut-lock, the combination of a threaded bolt having a longitudinal groove therein, a plate adapted to rest against the outer face of the nut and having holes near its ends and a hole in its center, a tooth projecting into said last-mentioned hole and adapted to enter the groove in the bolt, a U-shaped plate of spring metal having a hole in its center for the passage of the bolt, the parallel arms of said U-shaped plate adapted to lie against the sides of the nut and terminating in beveled heads adapted to pass through the holes near the ends of the first-mentioned plate and snap into locked engagement with said plate.

In testimony whereof I have signed this specification in the presence of two subscribing witnesses.

JOSEPH H. NEWCOMB.

Witnesses:
 MOSES SULLIVAN,
 G. J. SHAW.